M. EISELE.
RIDING ATTACHMENT FOR HARROWS.
APPLICATION FILED JUNE 4, 1908.
916,850.
Patented Mar. 30, 1909.
3 SHEETS—SHEET 2.
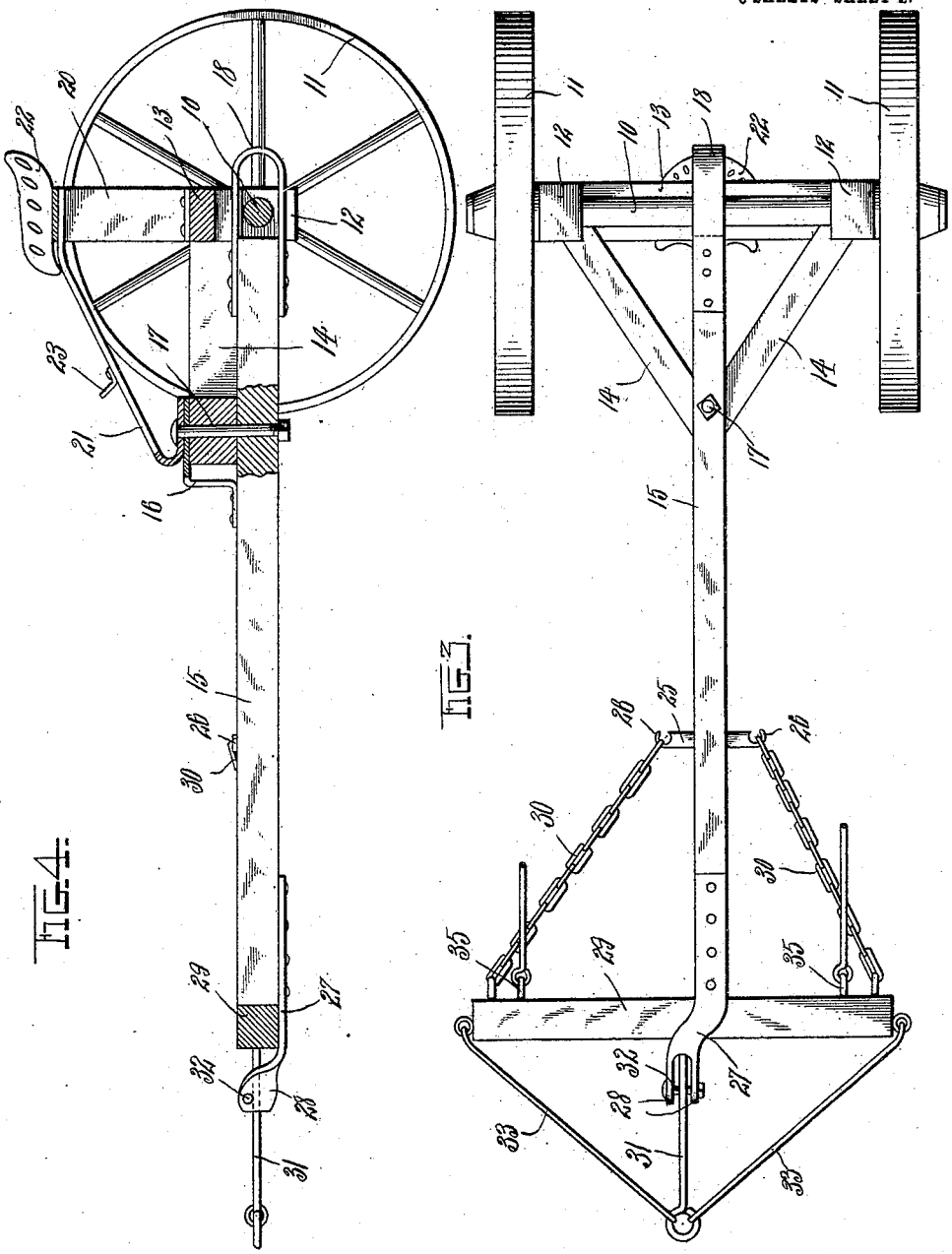
Witnesses
J. H. Crawford
F. L. Smith
Inventor
Martin Eisele
By
Attorneys M. EISELE.
RIDING ATTACHMENT FOR HARROWS.
APPLICATION FILED JUNE 4, 1908.
916,850.
Patented Mar. 30, 1909.
3 SHEETS—SHEET 3.
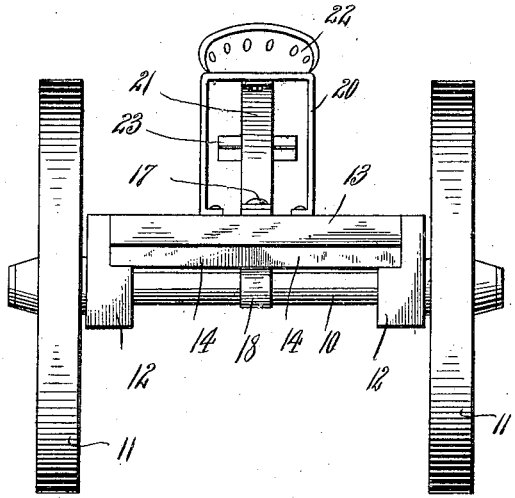
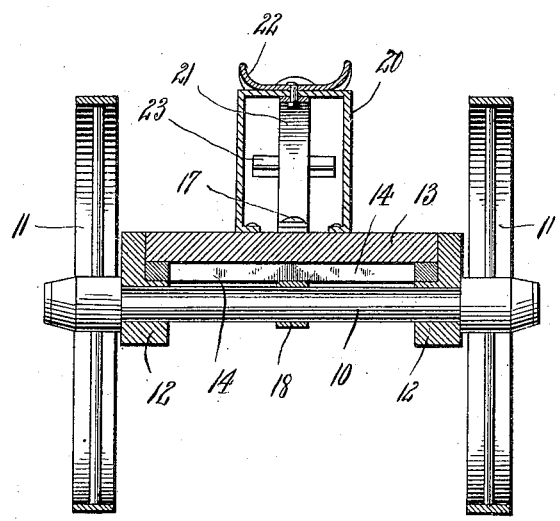
Inventor
Martin Eisele,
Witnesses

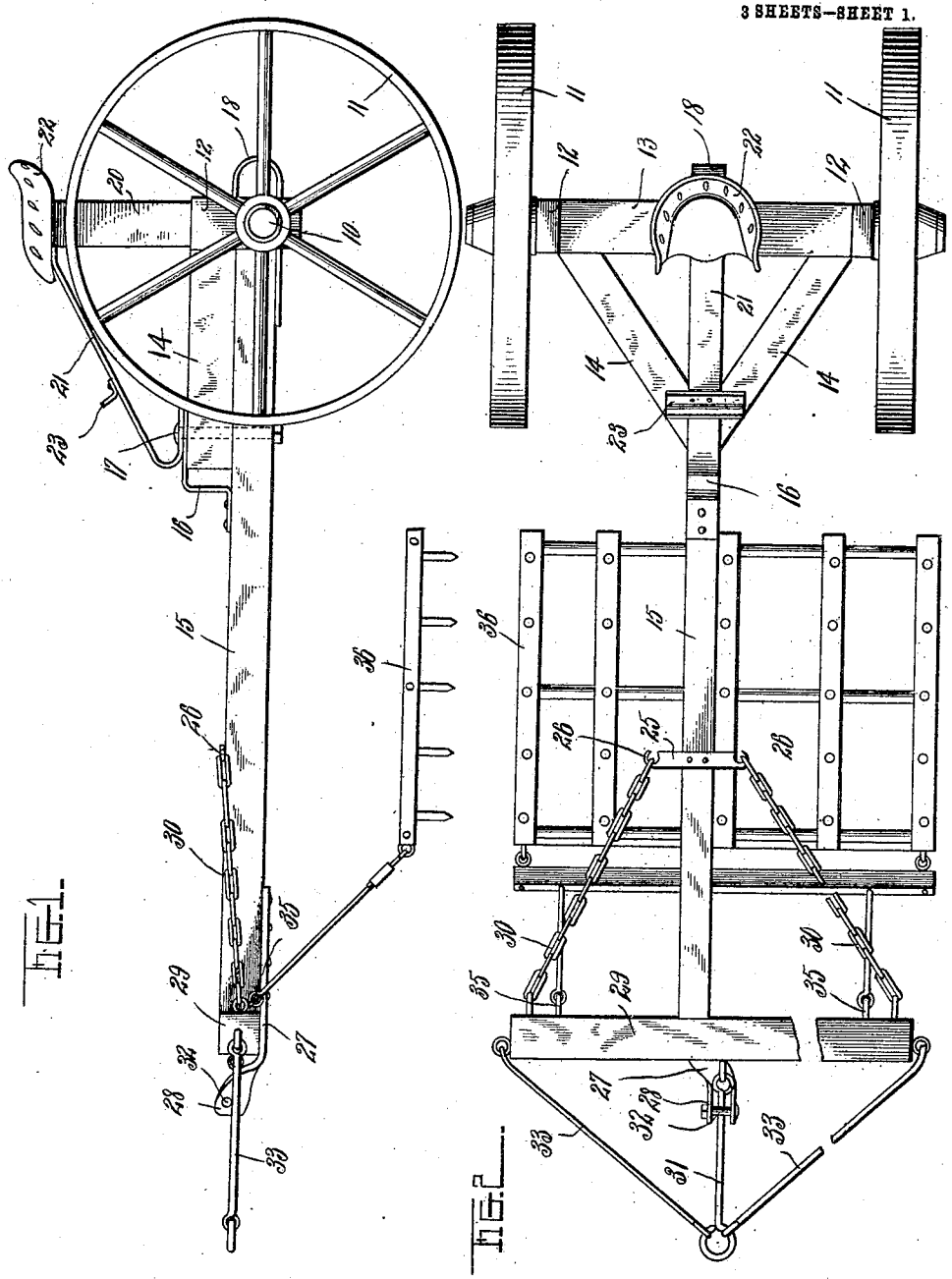

UNITED STATES PATENT OFFICE.

MARTIN EISELE, OF GRAYMONT, ILLINOIS.

RIDING ATTACHMENT FOR HARROWS.

No. 916,850.  Specification of Letters Patent.  Patented March 30, 1909.

Application filed June 4, 1908. Serial No. 436,717.

*To all whom it may concern:*

Be it known that I, MARTIN EISELE, a citizen of the United States, residing at Graymont, in the county of Livingston, State of Illinois, have invented certain new and useful Improvements in Riding Attachments for Harrows; and I do hereby declare the following to be a full, clear, and exact description of the invention, such as will enable others skilled in the art to which it appertains to make and use the same.

This invention relates to riding attachments for harrows and has as its primary object to provide a device of this class which may be applied to any ordinary draw-harrow now in use.

The invention is in the nature of a cart and one of the novel features of the invention resides in the specific manner in which the tongue is supported for lateral swinging movement upon the frame of the cart, the tongue being provided at its rear end with a loop which embraces the axle and in such manner as to permit of swinging of the tongue.

A further feature of the invention resides in the means provided for attaching the harrow to the cart I having aimed to provide for the quick attachment and detachment of the harrow.

In the accompanying drawings, Figure 1 is a side elevation of the device embodying my invention, Fig. 2 is a top plan view thereof, Fig. 3 is a bottom plan view, Fig. 4 is a vertical longitudinal sectional view taken in a line with the line of extent of the tongue of the device, Fig. 5 is a rear elevation, and, Fig. 6 is a vertical transverse sectional view taken in a line with the axle of the device.

In the drawings, the axle of the device is indicated by the numeral 10 and the wheels for supporting the device by the numeral 11 they being either fixed or journaled upon the axle at the end thereof as may be found expedient.

The frame of the device comprises a pair of boxings 12 which are loosely supported upon the axle one directly inwardly of each of the wheels 11, a cross piece 13 which connects the boxings and which extends directly above the axle and parallel therewith, and forwardly converging beams 14 which at their forward ends are secured together, they being secured at their rear ends to the boxings and to the cross beam 13.

The tongue of the attachment is indicated by the numeral 15 and fixed upon the tongue is a hammer strap 16 which has a portion extended upwardly and above the connected forward end of the forwardly converging beams 14 it being understood that the said ends of the said beams are received between the said portions of the hammer strap and the tongue 15, there being a bolt 17 passed through the said portions of the hammer strap, the said ends of the beams and the tongue. A yoke 18 is secured upon the tongue 15 at the rear end thereof and this yoke embraces, loosely, the axle 10 of the attachment it being understood that the tongue is permitted to turn upon the bolt 17 as a pivot and that the yoke 18 at the rear end of the tongue acts as a brace or additional support therefor. Fixed upon the cross beam 13 of the frame of the attachment and projecting vertically thereabove is a seat supporting frame 20 which is in the form of an inverted U and secured at its lower end at the connected forward end of the beam 14 by means of the pivot bolt 17, is a strap 21 which at its upper end is secured to the connecting portion of the seat supporting frame 20, there being a seat 22 fixed upon the said frame and a foot rest 23 fixed upon the said strap.

Secured upon the tongue 15 adjacent the forward end thereof is a plate 25 which is formed at each end with a hook 26 and secured at the extremity of the tongue is a clevis which comprises a plate or attaching portion 27 which is bolted or otherwise secured upon the under side of the tongue and which projects forwardly and laterally therefrom, the said plate being formed at its forward end with a pair of spaced apertured ears 28. The draw bar of the attachment is indicated by the numeral 29 and connected to the said bar adjacent each of its ends is the forward end of a chain 30, one of the chains being connected with one of the hooks 26 by engaging one of its links therewith and the other chain being connected with the other hook in the same manner. A rod 31 is pivoted at its rear end to the forward edge of the draw bar 29 and to one side of the middle thereof and this rod extends between the spaced apertured ears at the forward end of the clevis plate and is connected therewith by means of a pin 32 which is passed through the said ears above the said rod, thereby confining the rod between the said ears. Brace rods 33 are secured at their rear outer ends to the end of the draw bar 29 and converged forwardly therefrom and are secured at their forward ends to the forward end of the rod 31 as clearly shown in the drawings. The draw bar 29 is provided with a plurality of attaching rings 35 for the connection therewith of the harrow which is of the ordinary construction and is indicated by the numeral 36, it being understood that the draw bar 29 rests upon the clevis plate directly forwardly of the forward end of the tongue 15 and is supported by the said plate.

From the foregoing description of my invention it will be seen that I have provided a very simple construction of a harrow cart and one in which the harrow may be readily detached as may also the draw bar.

What is claimed is:

1. A device of the class described comprising an axle, a frame upon the axle, a tongue pivoted upon the frame, a loop secured upon the tongue at the rear end thereof and loosely embracing the axle, and a draw bar supported at the forward end of the tongue.

2. A device of the class described comprising an axle, a frame upon the axle, a loop secured upon the tongue at the rear end thereof and loosely embracing the axle, a laterally turned clevis secured at the forward end of the tongue, and a draw bar connected with the clevis.

3. A device of the class described comprising an axle, a frame upon the axle, a tongue, a loop secured upon the tongue at the rear end thereof and loosely embracing the axle the said tongue being extended forwardly beneath the frame, a hammer strap secured upon the tongue and having a portion extending above the frame and pivoted thereto, and a draw bar supported at the forward end of the tongue.

In testimony whereof, I affix my signature, in presence of two witnesses.

MARTIN EISELE.

Witnesses:
  ELLA J. SCANLON,
  C. R. TOMBAUGH.